United States Patent [19]
Greene et al.

[11] Patent Number: 5,368,338
[45] Date of Patent: Nov. 29, 1994

[54] INTERLOCKING UNION SYSTEM FOR DOUBLE CONTAINMENT PIPE

[75] Inventors: Karen C. Greene, Tulsa; James A. Cheek, Broken Arrow, both of Okla.

[73] Assignee: Conley Corporation, Tulsa, Okla.

[21] Appl. No.: 139,829

[22] Filed: Oct. 22, 1993

[51] Int. Cl.5 ............................................ F16L 47/02
[52] U.S. Cl. .................................. 285/133.1; 285/419; 285/915
[58] Field of Search ............... 285/133.1, 138, 915, 285/419, 93

[56] References Cited

U.S. PATENT DOCUMENTS

| | | | |
|---|---|---|---|
| 3,068,026 | 12/1962 | McKamey | 285/138 X |
| 3,146,005 | 8/1964 | Peyton | 285/138 X |
| 3,907,049 | 9/1975 | Baffas | 285/138 X |
| 4,108,476 | 8/1978 | Krupp | 285/133.1 X |
| 4,615,543 | 10/1986 | Cannon | 285/419 X |
| 4,779,652 | 10/1988 | Sweeney . | |
| 4,786,088 | 11/1988 | Ziu . | |
| 4,886,305 | 12/1989 | Martin . | |
| 4,930,544 | 6/1990 | Ziu . | |
| 4,939,923 | 7/1990 | Sharp | 285/93 X |
| 5,022,685 | 6/1991 | Stiskin et al. | 285/419 X |
| 5,087,308 | 2/1992 | Wermelinger | 285/133.1 X |
| 5,141,261 | 8/1992 | Ziu | 285/133.1 X |
| 5,143,407 | 9/1992 | Cokeh | 285/915 X |
| 5,186,502 | 2/1993 | Martin | 285/133.1 |

FOREIGN PATENT DOCUMENTS

| | | | |
|---|---|---|---|
| 0709051 | 8/1931 | France | 285/133.1 |
| 0908926 | 10/1962 | United Kingdom | 285/133.1 |
| 0631742 | 11/1978 | U.S.S.R. | 285/133.1 |

*Primary Examiner*—Randolph A. Reese
*Assistant Examiner*—Heather Chun Shackelford
*Attorney, Agent, or Firm*—Head & Johnson

[57] ABSTRACT

A containment interlocking union for use with a containment pipe which encloses a carrier pipe. The containment interlocking union is placed in position around a coupling in the carrier pipe. The interlocking union includes a first joint member and a second joint member positioned circumferentially adjacent to each other and coupled to the containment pipe. The first joint member comprises a first coupling portion of a major radius sealably engaging an outer circumferential surface of an end of the double containment pipe, a pair of second coupling portions of a minor radius adjacent the first coupling portion providing a pair of flanges abutting the ends of the carrier pipe coupling providing longitudinal support of the carrier pipe coupling, and a third coupling portion of an intermediate radius adjacent the second coupling portion.

10 Claims, 3 Drawing Sheets

INTERLOCKING UNION SYSTEM FOR DOUBLE
CONTAINMENT PIPE

BACKGROUND OF THE INVENTION

1. Field of the Invention

The present invention relates to double containment pipe systems. More particularly, the present invention relates to interlocking unions for double containment pipe systems. Still more particularly, our invention relates to double containment pipe systems having interlocking unions of synthetic resins reinforced with fiber glass.

2. Prior Art

A double containment pipe system is utilized for transporting fluids comprising an inner, or carrier, pipe, positioned concentrically within an outer, or containment, pipe. Both a carrier pipe and its related containment pipe are constructed by a series of pipe sections joined by pipe joints.

Traditionally, a carrier pipe system is intended to, and is constructed to, provide a means for transporting a fluid over a long distance efficiently and without allowing any of the fluid to escape from the carrier pipe system. The most common causes of escape of a fluid from a carrier pipe system are either a break in a pipe section, a break in a pipe joint, or a loosening of a pipe joint.

A carrier pipe system is constructed to be a safe and reliable means for transporting fluids, especially fluids which might be dangerous or which might contaminate the surrounding area should any escape from the carrier pipe system. Occasionally, a carrier pipe does fail and contaminating fluid covers the surrounding area.

The carrier pipe is normally independent from the double containment pipe which encloses it, and the double containment pipe is not in communication with the carrier pipe unless and until the carrier pipe should develop a leak. Then, the double containment pipe serves its basic purpose by collecting fluid escaping from the carrier pipe and becomes a means for transporting the fluid until the leak is discovered and repaired.

In any double containment pipe system the most elaborate component, and the component most likely to fail, is the pipe joint which joins two adjacent pipe sections of the carrier pipe system.

Pipe systems have been traditionally constructed of steel or other forms of metal. With the development of fiber glass reinforced resins, simple carrier pipe systems started to be constructed of fiber glass reinforced resins where such usage was permissible.

Double containment piping systems are, however, relatively new to the fiber glass resin pipe industry, and a great deal of the design requirements and capabilities of the fiber glass resin double containment systems are being developed even as the systems are being installed.

SUMMARY OF THE INVENTION

The primary object of our invention is to provide an interlocking union system for a double containment pipe which is easy to produce, easy to install, and efficient in operation.

Another object of our invention is to provide a double containment piping system which can be easily secured in position.

Still another object of our invention is to provide a containment interlocking union system of unique design and great strength.

Still another object of our invention is to provide a containment interlocking union system capable of easily and efficiently incorporating signal transmitting components within the system.

Still another object of our invention is to provide a double containment piping system of a design permitting easy access to the interior of the double containment system.

Still another object of the present invention is to provide an interlocking union system which will prevent longitudinal movement of the carrier pipe with respect to the containment pipe.

As the use of pipe formed of synthetic resin reinforced with fiber glass became acceptable and developed for use in double containment piping systems, we were able to anticipate some of the special requirements in this field. To develop the double containment piping system one must understand how best pipe formed of fiber glass reinforced resin might be utilized for double containment piping systems.

The inherent qualities of fiber glass reinforced resin permit constructing a fiber glass reinforced resin double containment piping system having numerous advantages over a double containment system constructed of steel or other strong and heavy metal, particularly in the design of the closure joint.

Pipe formed of fiber glass reinforced resin is light weight, which makes it easy to handle and transport. Fiber glass resin pipe and pipe joints are easy to manufacture, even in the intricate structures designed for our invention.

Also, another outstanding quality of pipe and pipe joints molded of the typical synthetic resin used for their manufacture is that the pipe and pipe joints are substantially inert to any of the chemicals to which the double containment system might subsequently be exposed.

The double containment piping system of the present invention comprises a containment pipe with the pipe sections secured to each other by pipe joints of unique design. The pipe joints were designed also to provide efficient seals for the double containment pipe, and to secure the double containment pipe system in position concentrically around the carrier pipe.

Thus, the interlocking union system of the present invention effectively serves three purposes in a double containment piping system.

The first purpose is to effect a seal in the containment or outer pipe of the system. This seal may be provided as a permanent closure by using a standard adhesive or sealant, such as an epoxy material, or as a temporary closure by using a silicone sealant with clamps.

A permanent closure made with our fiber glass resin pipe joint can be rated for the same pressure as a standard pipe and fittings of the same size. A temporary closure as we described would be rated for only 10 to 15 psi.

The second purpose of our containment interlocking union system is as a support system or anchor point for the carrier pipe. In double containment piping systems, this inside pipe or carrier pipe should be restrained from movement relative to the outer pipe in order to minimize bending stress on all the fittings. Movement may occur from thermal expansion or contraction due to fluid through the pipes and the external temperature.

We have provided stops at both ends of the interlocking union that will physically restrain the carrier pipe coupling, both with the permanent mode of attachment and with the temporary mode.

The third purpose of the containment interlocking union system is to serve as a "pull point" for any cable detection system that may be used with the double containment system. Since the double containment joint will be the last component to be installed when the double containment piping system is assembled, the closure joint becomes a natural place in which to provide an opening to pull a detection cable. For instance, a cable of a signal system may be threaded or pulled through a unique space within the containment interlocking union system, and a closure is held in place to complete the installation of the joint. Thus, our interlocking union system is constructed of two cooperating components which seal together around the carrier pipe with the signal cable sealed within.

Further, a special version of our joint includes a threaded opening in the lower section of the pipe joint fitted with a threaded plug which will permit access to the enclosed detection cable for replacement or repair of the cable when necessary.

The interlocking union system has several benefits over the currently available type of joint in existing double containment systems.

When compared to other "split coupling" types of joints, our interlocking union system carries a full system pressure rating whereas the other joints do not. We have provided for this advantageous type of rating through our design of a large area of adhesive contact between the two longitudinal components.

Most other double containment systems require that the containment or outer pipe be moved by sliding the containment joint back along the containment pipe in order to visually inspect the carrier joints then sliding in place again to make the final containment connection.

In some systems it is very difficult to completely install and test the entire carrier or inside piping and yet have a system in which it is easy to visually check all of these carrier pipe joints.

Another improvement we have developed concerns the anchoring of the double containment system. In some currently available double containment systems the carrier pipe is anchored to the containment pipe only at the elbows. This not only increases the stress at the elbows after the system is installed, but requires an elbow that is very expensive to manufacture by reason of special design.

Our containment interlocking union is designed to absorb a great deal of the stress inherent in the construction of a double containment system, so that the carrier pipe system may be built with standard elbows.

We have designed our containment interlocking union system so that, preferably, both halves of the joint may be secured in position upon the double containment pipe by positioning the two halves upon the double containment pipe. In this manner, the joint will fit securely around both the double containment pipe and the carrier pipe, and, with the minor inner radius of each fitting firmly against the opposite edges of the carrier pipe coupling. The use of identical closure joint components would make simpler the manufacture, storage, and use of the closure joints.

Each joint should preferably include a longitudinal channel made along the intermediate radius portion so that there will be communication from one end of the double containment closure joint to the other, and in the event that the carrier pipe joint breaks, as would fulfill the purpose of the closure joint.

We have furthermore designed this communication channel to be adaptable for placement of a signal cable along the length of the double containment piping system, if desired. In any event, the channel may be positioned at either the upper or lower portion of the closure joint.

The major inner radius of each end of each closure joint is sealably attached to the double containment pipe as is intended for the use of the double containment piping system, and, preferably, in a manner that each half of the joint member surrounds substantially one-half of the circumference of the double containment pipe.

The above objects and advantages of our invention will become apparent from our description of the following preferred embodiments of our invention.

DETAILED DESCRIPTION OF THE PREFERRED EMBODIMENTS

Figure 1:
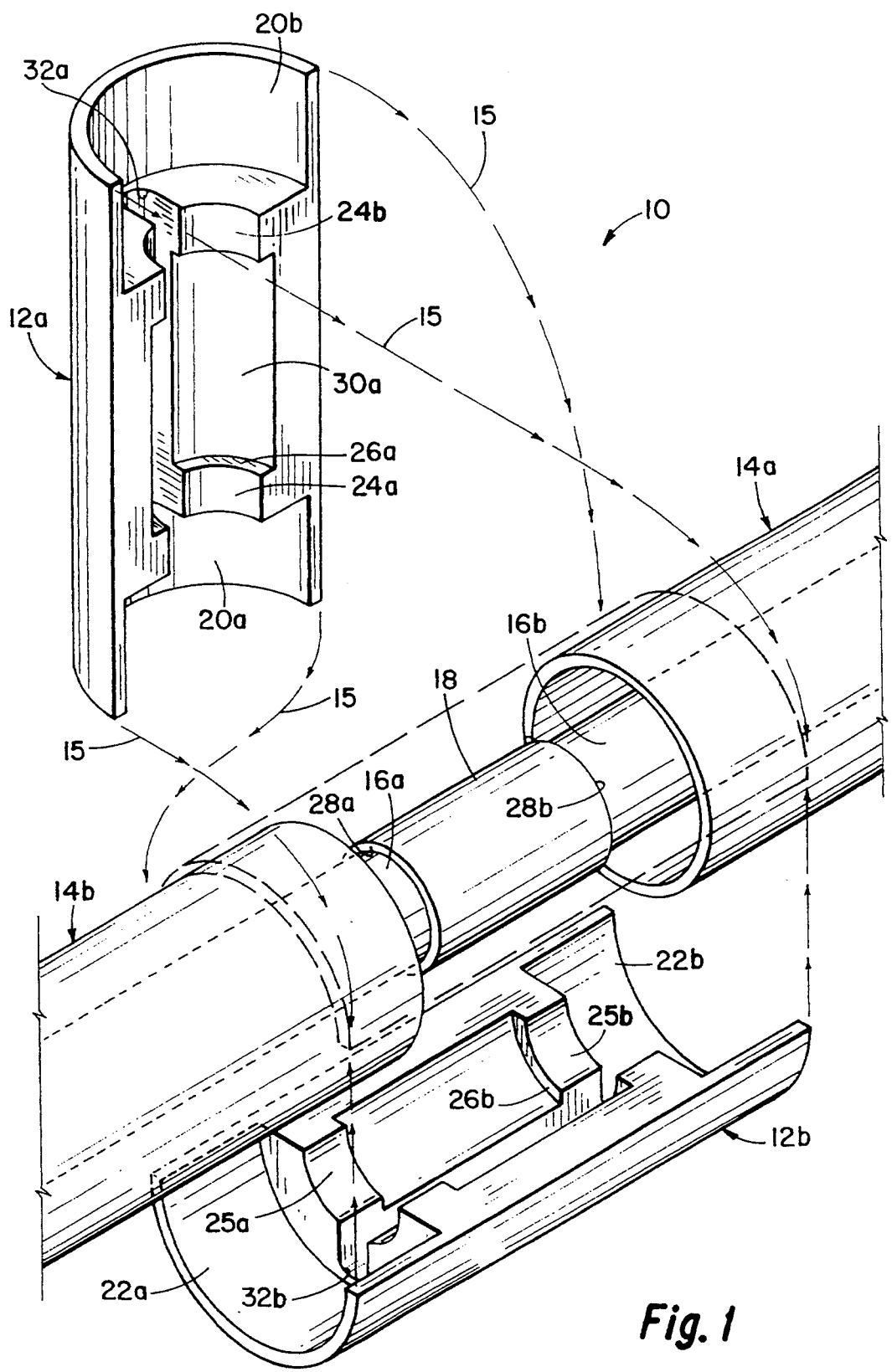
FIG. 1 is an isometric view of a containment interlocking union system according to our invention showing the typical placement of components around a carrier pipe.
Figure 2:
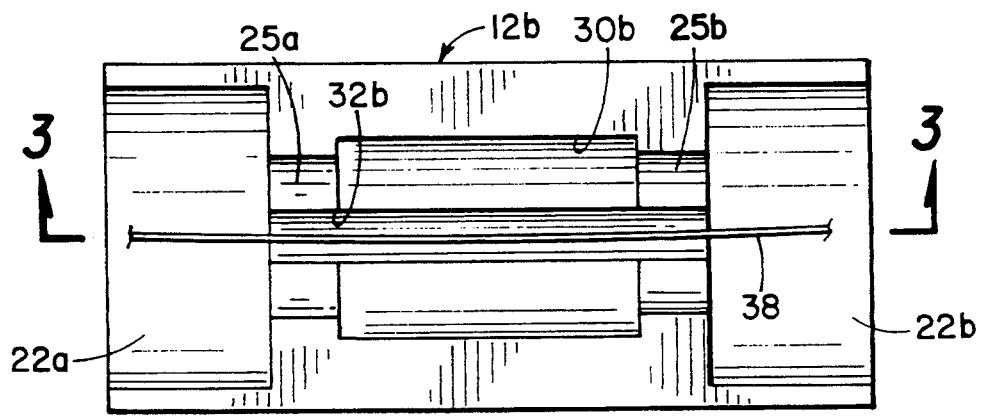
FIG. 2 is a top view of a containment interlocking union system according to our invention.
Figure 3:
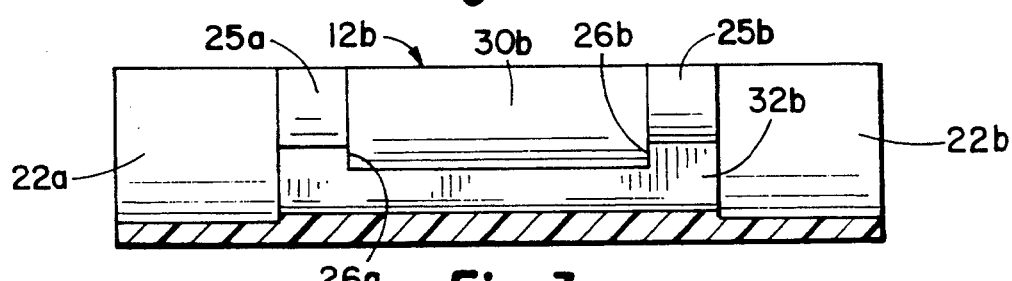
FIG. 3 is a view of a containment interlocking union system according to our invention along section lines 3—3 of FIG. 2.
Figure 5:
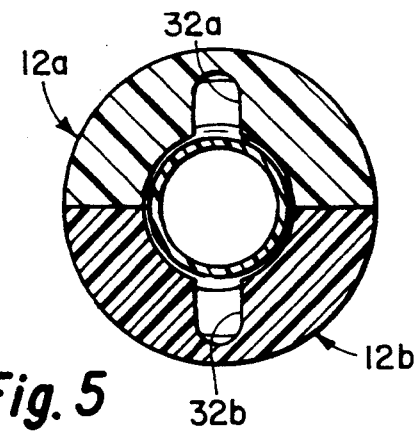
FIG. 5 is a sectional view of a containment interlocking union system according to our invention along the lines 5—5 of FIG. 4.
Figure 6:
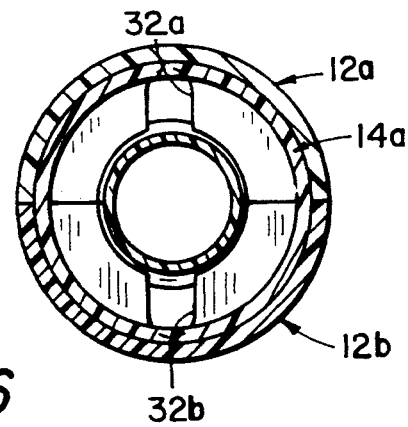
FIG. 6 is a sectional view of a containment interlocking union system according to our invention along the lines 6—6 of FIG. 4.

FIG. 1 is an isometric view of a containment interlocking union system 10 generally, according to our invention, showing the manner in which two interlocking union members, 12a and 12b, generally, are in an intermediate position about to be placed in their secure positions about a double containment pipe 14a, and 14b, generally.

Figure 4:
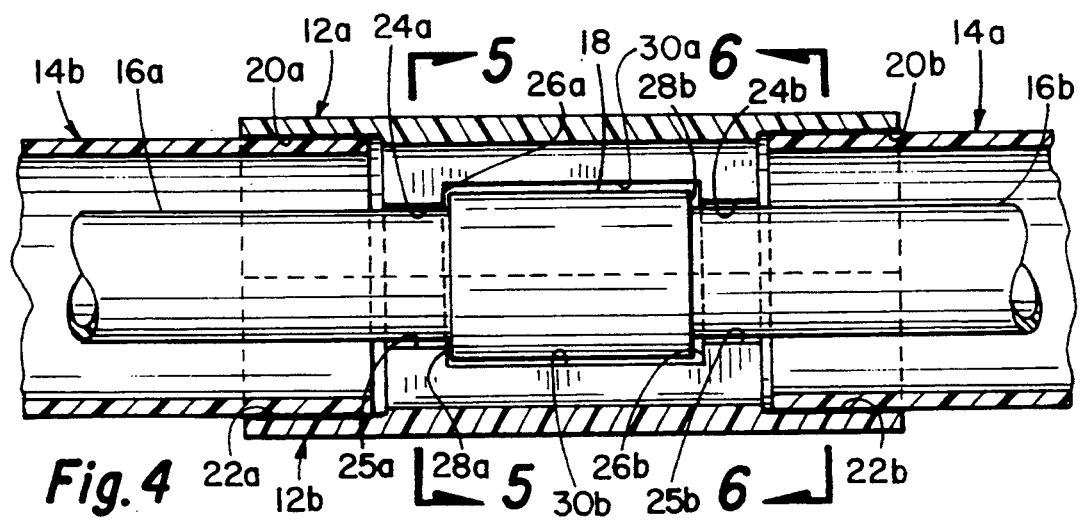
FIG. 4 is a sectional view of a containment interlocking union system as it would be in position around a carrier pipe.

FIG. 1 and FIG. 4 show the manner in which the components, interlocking union members 12a and 12b and pipe sections 14a and 14b are placed in position surrounding a carrier pipe comprising carrier pipe sections 16a and 16b joined by carrier pipe joint coupling 18. The carrier pipe coupling 18 is adhesively secured to the pipe sections to form a fluid tight seal.

Arrows 15 show positioning of the interlocking union members about the carrier pipe. The containment pipe 14 is concentric with the carrier pipe 16.

As shown clearly in FIGS. 1, 2, 3, and 4, the interlocking union system is composed of three levels of radius to the double containment pipe and to the carrier pipe. The three interior levels are a major inner radius, a minor inner radius, and of an intermediate inner radius.

In FIGS. 1, 2, 3, and 4, a major inner radius of each closure joint member 12a and 12b, shown by the interior surfaces 20a and 20b of first coupling portions of first closure joint member 12a, and interior surfaces 22a and 22b of closure joint member 12b, respectively. The major radius portions of these coupling portions are of an inner radius only very slightly larger than the circumference of the double containment pipe so that each coupling portion 20a, 20b, 22a, and 22b can be sealably secured to the double containment pipe sections 14a and 14b, in either the permanent or temporary manner of joinder described above.

Interlocking union member 12a includes a second coupling portion of a minor inner radius 24a and 24b adjacent major radius portions 20a and 20b, respectively. Interlocking union member 12b includes a second coupling portion of a minor inner radius 25a and 25b adjacent major radius portions 22a and 22b, respectively.

The minor inner radius portions form flanges which provide flange walls 26a and 26b which abut end walls 28a and 28b on the carrier pipe coupling 18. When secured in place against the carrier pipe coupling 18, these flange portions restrain movement of the carrier pipe coupling and carrier pipe with respect to the containment interlocking union system and in turn, the containment pipe.

We have further designed our closure joint members 12a and 12b to include a third coupling portion of an intermediate radius shown as coupling portions 30a and 30b, respectively. Intermediate portions 30a and 30b are designed to fit snugly against, to and in support of the carrier pipe coupling 18.

While adhesive might be used, it has been found that adhesive is not required between portions 30a and 30b and the pipe joint coupling 18.

As shown in FIGS. 1, 2, 5, 6, 7, and 9, each closure joint member 12a and 12b includes a longitudinal channel 32a and 32b, respectively, which provides communication between spaces within the containment pipe outside each end of each closure joint member in event of the breakage or leakage of the carrier pipe joint.

Figure 7:
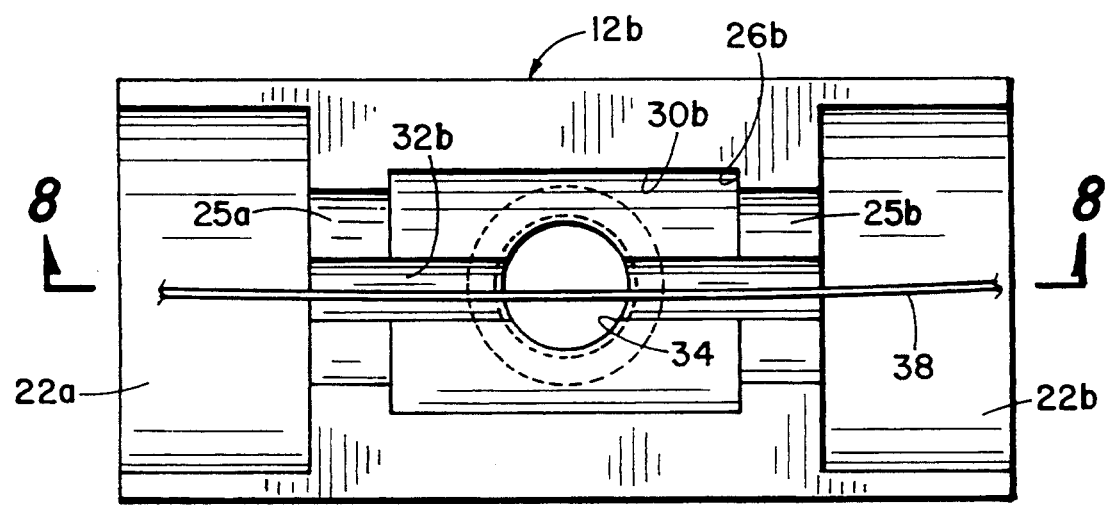
FIG. 7 is a top view, similar to FIG. 2, of a containment interlocking union system according to our invention showing a threaded opening therein in communication with a longitudinal channel.
Figure 8:
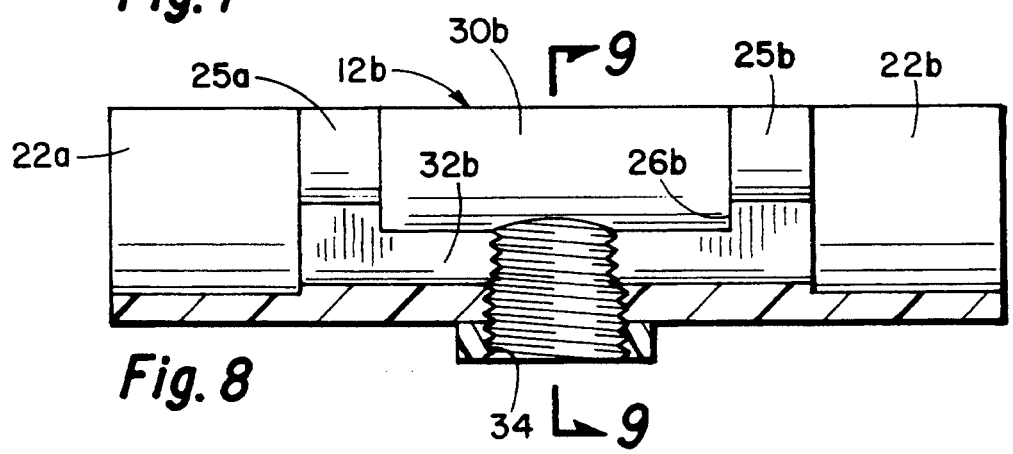
FIG. 8 is a sectional view of a containment interlocking union system according to our invention along the lines 8—8 of FIG. 7.
Figure 9:
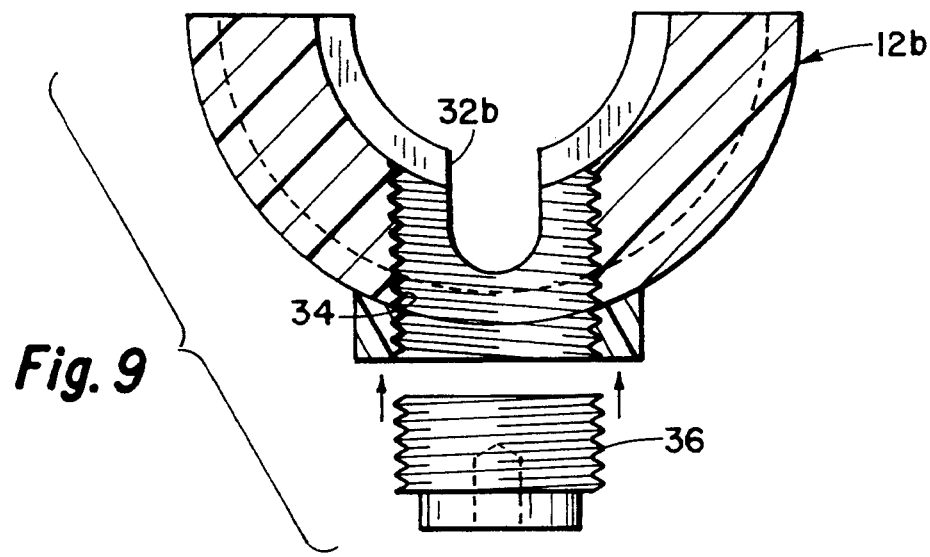
FIG. 9 is a cross sectional of a containment interlocking union system according to our invention along the lines 9—9 of FIG. 8.

In FIGS. 7, 8, and 9, we show a modified version of our closure joint member in which we have provided a threaded opening 34 fitted with a plug 36 for the purpose described above. When a detection cable 38 is installed in channel 32b and it is desirable to have easy access to the detection cable, access may be provided simply by removing the threaded plug 36.

Since many different embodiments of our invention may be made without departing from the spirit and scope thereof, it is to be understood that the specific embodiments described in detail herein are not to be taken in a limiting sense, since the scope of the invention is best defined by the appended claims.

What is claimed is:

1. A containment interlocking union system for use with a carrier pipe having a carrier pipe coupling positioned within a containment pipe, wherein said interlocking union system comprises:

a first closure joint member having a series of concentric coupling portions adapted to coupled said first closure joint member to the containment pipe and to the carrier pipe coupling, said first closure joint member having a first coupling portion of a major inner radius sealably and adhesively engaging an outer circumferential surface of an end of each double containment pipe, a pair of second coupling portions of a minor inner radius adjacent the first coupling portion providing a pair of flanges abutting an end wall of the carrier pipe coupling, providing longitudinal support of the carrier pipe coupling, and a third coupling portion of an intermediate inner radius adjacent the second coupling portion; and a second closure joint member positioned circumferentially adjacent the first closure joint member and adapted to couple said second closure joint member to the containment pipe.

2. A containment interlocking union system as described in claim 1 wherein said first closure joint member engages substantially one-half the outer circumference of the containment pipe and the second joint member engages the balance of the outer circumference.

3. A containment interlocking union system as described in claim 2 wherein said first closure joint member and said second closure joint member each having a pair of longitudinal edges and wherein a longitudinal edge of the first closure joint member sealably joins a longitudinal edge of the second closure joint member.

4. A containment interlocking union system as described in claim 3 wherein each joint member includes a longitudinal channel providing communication between spaces between the containment pipe and the carrier pipe coupling.

5. A containment interlocking union system as described in claim 4 wherein a closure joint member includes a threaded opening communicating with the channel in that closure joint member and the threaded opening is fitted with a threaded plug to provide easy access to the channel from outside the double containment joint.

6. A containment interlocking union system as described in claim 3 wherein a longitudinal channel is in a lower closure joint member below the carrier pipe.

7. A containment interlocking union system as described in claim 6 wherein the lower closure joint member includes a threaded opening communicating with the channel in that closure joint member and the threaded opening is fitted with a threaded plug to provide easy access to the channel from outside the double containment closure joint.

8. A containment closure joint as described in claim 7 wherein a detection cable is placed within the channel of the lower closure joint member.

9. A containment interlocking union system as described in claim 1 wherein:

the first and second closure joint members are identical and are positioned upon the containment pipe in opposite longitudinal disposition.

10. A containment interlocking union system as described in claim 9 wherein the first coupling portion of each closure joint member engages one-half the outer circumference of the containment pipe.

* * * * *